2,794,953
Patented June 4, 1957

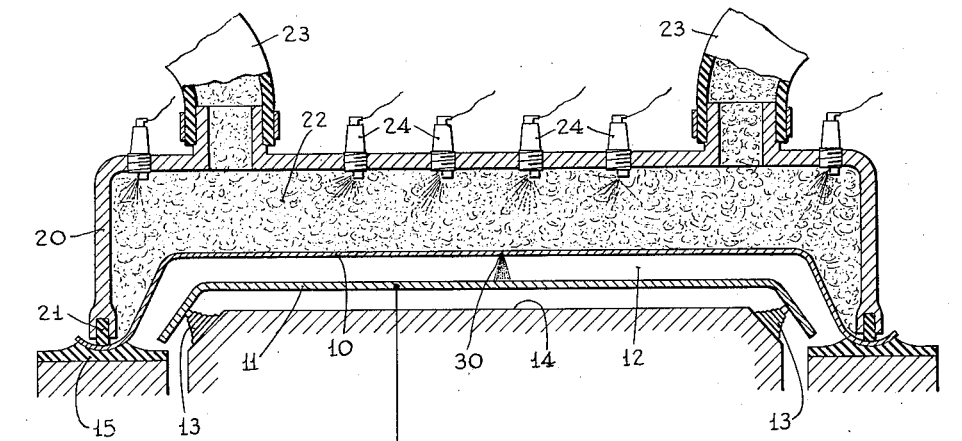
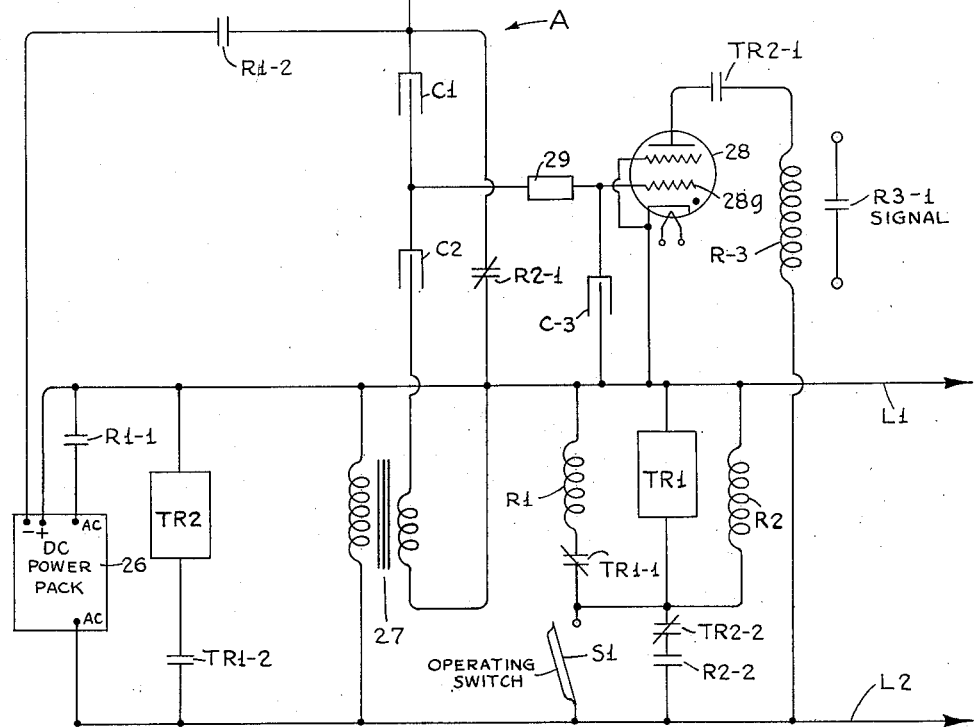

2,794,953

METHOD AND APPARATUS FOR TESTING WALL CONTINUITY BY CAPACITANCE ALTERATION

Edwin M. Callender, Cynwyd, Pa., assignor to The Budd Company, Philadelphia, Pa., a corporation of Pennsylvania Application February 25, 1954, Serial No. 412,455

6 Claims. (Cl. 324—71)

This invention relates to method and apparatus for testing the continuity of walls by change of capacitance between charged surfaces. The wall to be tested is arranged as a separator between a charged element and a discharge environment or medium in such manner that a continuous imperforate wall will prevent discharge of the charged element whereas a crack or opening through the wall will cause an alteration in the charge of the charged element and give an indication of the presence of such a defect.

The capacitance field will remain at approximately uniform value for an appreciable period of time in the presence of normal atmospheric air or a non-ionized space but will change abruptly if the normal environment is disturbed by media of certain kinds which will enter the capacitance field if a crack is present in the test sheet which, otherwise without a crack, protects the capacitance field from the discharging medium.

If metal sheets are being tested they may be used as one element of a two-plate capacitor arrangement with the capacitance charge or field located between plates. The test sheet then forms a barrier or screen against the capacitance-changing medium located at its outer side. The sheet, for example, may be travelling along a given path in a line of such sheets, and when it arrives opposite a companion capacitor sheet a charge may be created between sheets and then the capacitance-changing medium is caused to scan or cover all of the area of the test sheet in search of an opening. The test sheet may be scanned, as by a transverse curtain line or travelling spot of the medium as it travels or it may be completely covered over its entire area at one time.

The capacitance-changing medium may be of various kinds, such as damp air, ionized air (ozone), a radioactive emanation, or the like. The use of ionized air provides a simple, positive and inexpensive test, and this will be disclosed herein.

The single figure shows a test set-up and associated charging and signal circuit means in diagrammatic form.

In the illustrative drawings a test sheet or specimen 10, as in a moving line on a conveyor, is brought opposite a capacitance plate 11 to leave a space 12 between them. The plate 11 may be carried on insulators 13 on a fixed grounded support 14 and the sheet 10 is preferably brought upon peripheral sealing insulation 15 in such manner as to seal its edges against entry of the discharging medium, such as a fluid, above the sheet. If the insulated plate 11 is charged, the metal parts near it take a space charge. If support 14 is grounded, it directly forms the second major element of the capacitor, plate 11 being the other, and if sheet 10 is ungrounded, it acts in space, along with support 14, to constitute the second element of the capacitor. If sheet 10 is also grounded past or through the edge-sealing element 15, it will act directly with the support 14 as the second element of the capacitor.

The capacitance-changing medium is played above the top of the test sheet and if a crack is present it will enter the capacitance zone 12. For rapid and certain action it is preferable to provide an enclosed space for the medium and for this purpose a cover 20 may be brought down over the test sheet and sealed in gas-tight manner around its edges as by a peripheral insulating strip 21. The strip 21 also forms an electrical insulation between the cover 20 and the sheet 10. Fluid, such as air, may be forced into the space 22 between the test sheet and cover, as by flexible tubes 23, and the fluid may be ionized in any convenient manner as by radioactive material, spark plugs, or other known means, spark plugs 24 being illustrated.

When the parts are in position a charge is created between the test sheet 10 and plate 11, as by a circuit which is generally indicated by the letter A. It may be assumed that the cover 20 closes a limit switch S1 in the circuit to very rapidly create the charge. Power is provided by A. C. lines L1, L2 (L1 being grounded with support 14) and, when switch S1 is closed, it energizes the coil of a relay R1 to close its switch R1–1 and energize a D. C. charging power pack 26. Energization of coil R1 also closes switch R1–2 to place a charge from the power pack 26 on the plate 11 and on capacitors C1 and C2. At the same time, by closure of switch S1, a relay R2 and a time delay charging relay TR1 are energized. When R2 is energized it opens its normally closed switch R2–1 to remove the shunt line past capacitors C1, C2 to allow them to take a charge. R2 also closes the lock-in switch R2–2 for itself and TR1.

After a given period of time for charging, which may be very short, the time delay relay TR1 opens a switch TR1–1 to de-energize R1 and open R1–1 and R1–2 and thereby cut off the charging current. After its delay, relay TR1 also closes a switch TR1–2 to energize the coil of a time delay relay TR2. When coil TR2 is energized, immediately, it closes a switch TR2–1 and supplies current to the plate and cathode of a thyratron gas tube 28.

The capacitors C1, C2, when charged, along with plate 11, apply a hold-off charge to the grid 28g of the tube 28 and no current will flow through the tube. A filter including a capacitor C3 and a resistor 29 are provided for the grid 28g.

If the capacitors C1, C2 are discharged, as by discharge of the plate 11, the grid 28g will not hold off the current through the tube 28 and there will be a flow of current to energize the coil of a signal relay R3 and close its switch R3–1 and provide the required signal.

A transformer 27 applies a teasing action on the capacitors C1, C2 to aid their action.

If the sheet 10 on test is imperforate there will be no passage of the capacitance-changing medium from outside to the charged space 12 and no signal will be given; but if there is a crack in the sheet there will be passage of the medium and the field charge will be so altered that a signal will be given. At 30 a crack is indicated to be present to allow ionized air to enter the charged zone to discharge the field.

Operation of time delay relay TR2 not only closes TR2–1 but opens a switch TR2–2 to de-energize R2 and TR1 in preparation for the next test.

When the test sheet is removed the switch S1 is opened ready for a repetition of the test cycle.

If the test sheet 10 is of non-metallic material the capacitance charge can be established between plate 11 and the cover 20, as by a different sheet grounding arrangement in the charging circuit. In this case the ionized air will exist above the sheet but cannot discharge the field unless there is a crack in the sheet to allow the medium to reach the plate 11. In all other respects the action is the same as with a metal sheet.

In the test set-up a charging voltage of 500 was used and appeared to be quite adequate. Such voltages can be made completely safe to operating personnel by means of limiting resistors or by limited power pack.

The charging current is very moderate and within the limits of perfect safety to personnel.

It is thus seen that the invention provides simple, effective and inexpensive means and method for testing sheets and other normally impervious walls for cracks or openings.

While one embodiment has been disclosed for purposes of illustration, it is to be understood that there may be various embodiments within the scope of the invention.

I claim:

1. The method of testing for openings in a wall which comprises, establishing a capacitance field on one side of the wall, establishing a capacitance-charge-changing medium on the other side of the wall, and registering the change in capacitance charge when the medium encounters and passes through an opening in the wall.

2. The method of testing for openings in a sheet or wall which comprises, establishing a capacitance field on one side of the sheet, introducing to the other side of the sheet a capacitance-charge-changing gaseous medium under pressure which will pass through openings in the sheet if present, and measuring the change in capacitance charge when the medium encounters and passes through an opening in the sheet.

3. The method of testing for openings in a sheet which comprises, bringing the sheet into spaced insulated sealing relationship with a capacitance plate, bringing an enclosure into spaced insulated sealing relationship with the sheet, producing a capacitance charge between the sheet and plate, providing between the sheet and enclosure a supply of ionized gas under pressure which will pass through openings in the sheet if present, and after a predetermined time checking the capacitance charge change to determine whether there has been a change caused by the presence of an opening in the sheet.

4. The method of testing for openings in a metal sheet which comprises, bringing the sheet into insulated sealing spaced relationship to a capacitance plate, bringing an enclosure into spaced insulated sealing relationship with the side of the sheet opposite the plate, producing a capacitance charge from a source between the sheet and plate, providing between the plate and enclosure an ionized gas under pressure which will pass through openings in the sheet if present, and after a predetermined time disconnecting the plate from the charging source and checking the capacitance charge change to determine whether there has been a change caused by the presence of an opening in the sheet.

5. Apparatus for testing for openings in a sheet, comprising in combination, a capacitance plate, means for retaining a test sheet in insulated spaced relationship to the plate, means for producing a capacitance charge in the space between the plate and sheet, means for covering the sheet area with a capacitance-charge-changing medium which is capable of passing through a hole in the sheet if present, and means for detecting a change in capacitance charge as an indication of the presence or absence of a hole in the sheet.

6. Apparatus for testing for openings in a sheet, comprising in combination, a capacitance plate, means for holding a metal test sheet in insulated spaced relationship to the plate, means for producing a capacitance charge between the sheet and plate, an enclosure and means for holding the enclosure in insulated spaced relationship to the side of the sheet opposite the plate, means for introducing into the enclosure and against the sheet an ionized gas which is capable of passing through a hole in the sheet if present, and means for detecting a change in capacitance charge as an indication of the presence of a hole in the sheet.

References Cited in the file of this patent

UNITED STATES PATENTS

| 2,097,760 | Failla | Nov. 2, 1937 |

FOREIGN PATENTS

| 486,856 | Great Britain | June 7, 1938 |